Figure 1:
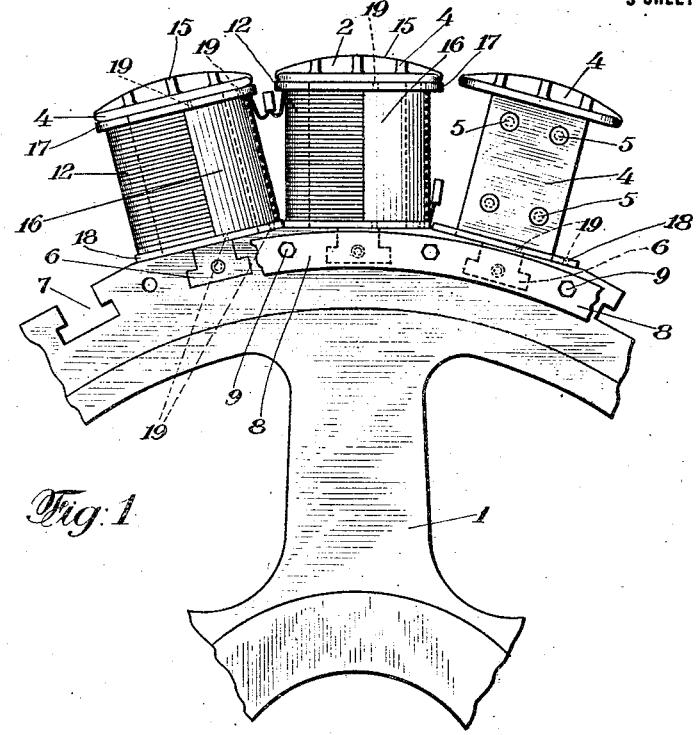

M. E. THOMPSON.
DYNAMO ELECTRIC MACHINE.
APPLICATION FILED JUNE 23, 1910.

1,138,912.

Patented May 11, 1915.
3 SHEETS—SHEET 1.

Witnesses:
J. O. Gemper
George Schlatt

Milton E. Thompson,
Inventor,
By his Attorneys
Kenyon & Kenyon

M. E. THOMPSON.
DYNAMO ELECTRIC MACHINE.
APPLICATION FILED JUNE 23, 1910.

1,138,912.

Patented May 11, 1915.
3 SHEETS—SHEET 2.

Witnesses:
J. O. Gempler
George Schlett

Milton E. Thompson,
Inventor,
By his Attorneys
Kenyon & Kenyon.

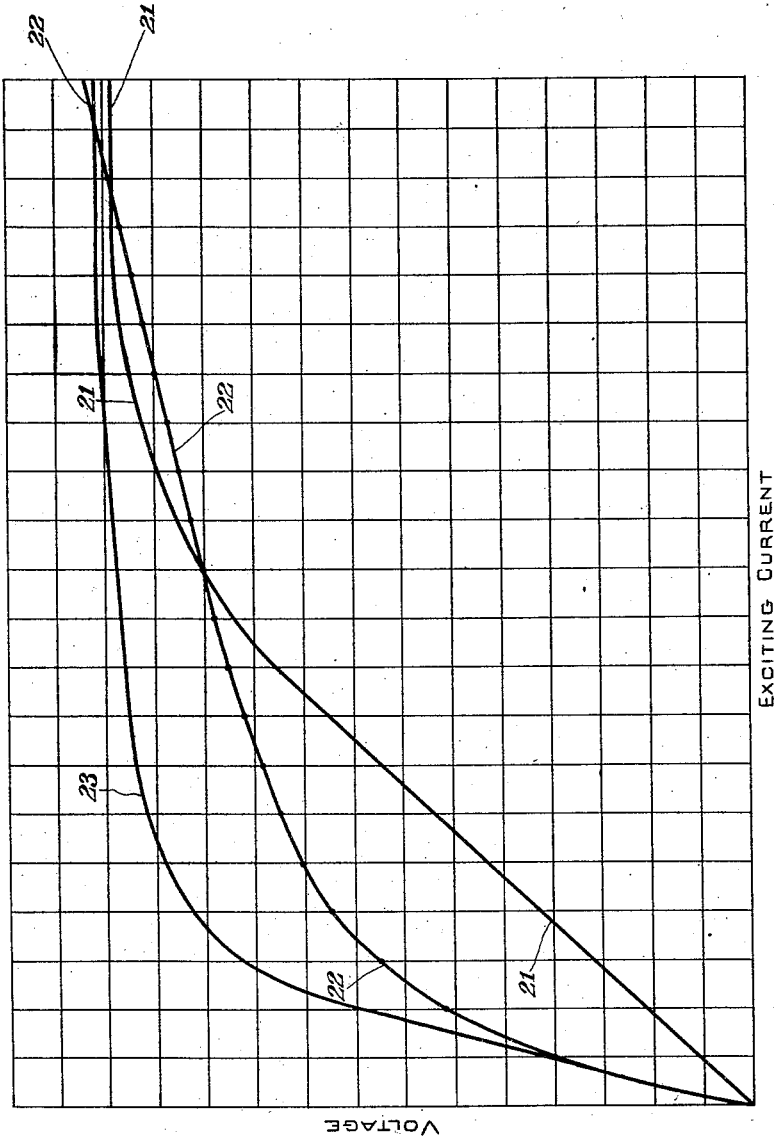

UNITED STATES PATENT OFFICE.

MILTON E. THOMPSON, OF RIDGWAY, PENNSYLVANIA.

DYNAMO-ELECTRIC MACHINE.

1,138,912.      Specification of Letters Patent.      Patented May 11, 1915.

Application filed June 23, 1910. Serial No. 568,453.

*To all whom it may concern:*

Be it known, that I, MILTON E. THOMPSON, a citizen of the United States, and a resident of Ridgway, Elk county, State of Pennsylvania, have invented certain new and useful Improvements in Dynamo - Electric Machines, of which the following is a specification.

My invention relates to alternating current dynamo electric machines and involves an improved construction of the field magnet structure. My improvements in the field structure have for their object the obtaining of closer inherent regulation than has heretofore been obtained in alternating current dynamos, such regulation being secured while maintaining a high degree of efficiency. By my invention, moreover, I am enabled to obtain good regulation at high power factors while being able to maintain the full voltage under heavy loads at low power factors with good inherent regulation under such conditions. By my invention also I am enabled to secure a wide range of operating voltage while maintaining a good inherent regulation at all loads and power factors.

I have particularly applied my invention to alternators of the rotating field type and I will show and describe a specific alternator of such type, but my invention is not necessarily limited to rotary field alternators. The more usual form of construction of the rotor or rotary field of an alternator includes a series of pole pieces each surrounded by an exciting field coil wound so as to produce alternate north and south poles, the pole pieces being mounted on the outer periphery of a wheel, which latter constitutes the support therefor and is also a magnetic yoke for closing the magnetic circuits between the inner ends of the pole pieces. I have particularly applied my invention to this form of rotary field although my invention is not necessarily limited to this particular form of structure.

Hitherto in alternators a large air gap for clearance has been provided between the field poles and the armature in order to provide a high reluctance in the magnetic circuit so as to prevent severe demagnetizing effects from the armature currents, which would result in very bad inherent regulation. In an alternator field structure embodying my invention this large air gap is eliminated and only sufficient gap for clearance purposes is provided at this point. I am enabled to eliminate this feature of the present construction of alternators in my improved alternator by so constructing the field structure as to provide a portion of the magnetic circuit at the roots or bases of the pole pieces of relatively much increased reluctance. I preferably form this portion of the magnetic circuit by sub-dividing the iron into a number of highly restricted portions each of considerable length in the direction of flow of the magnetic lines relatively to the smaller dimension lying transverse to such flow. By this construction I am enabled to produce a magnetization curve that will give much better inherent regulation than has hitherto been obtained, this being partly due to the character of the high reluctance portion of the circuit and partly due to the location thereof which eliminates leakage of the flux, all as will be more fully explained hereinafter.

Further objects, features and advantages will more clearly appear from the detailed description given below taken in connection with the accompanying drawings which form a part of this specification.

Figure 2:
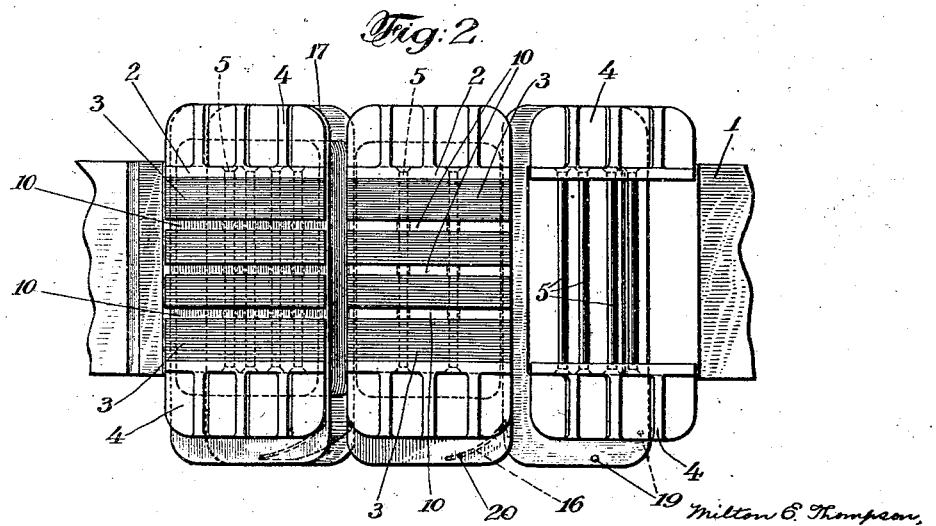
Figure 3:
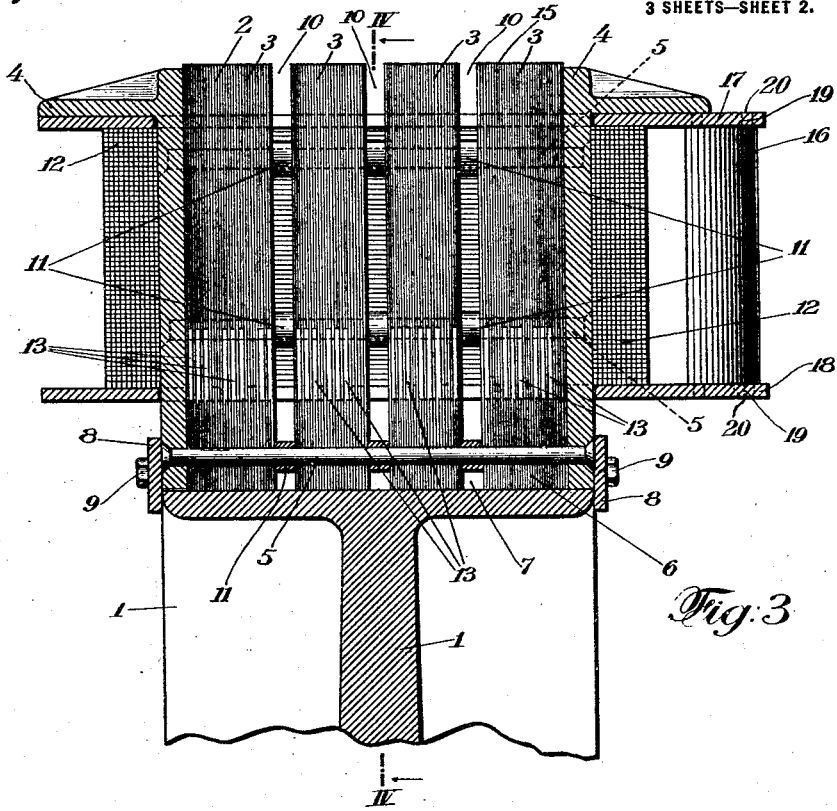
Figure 4:
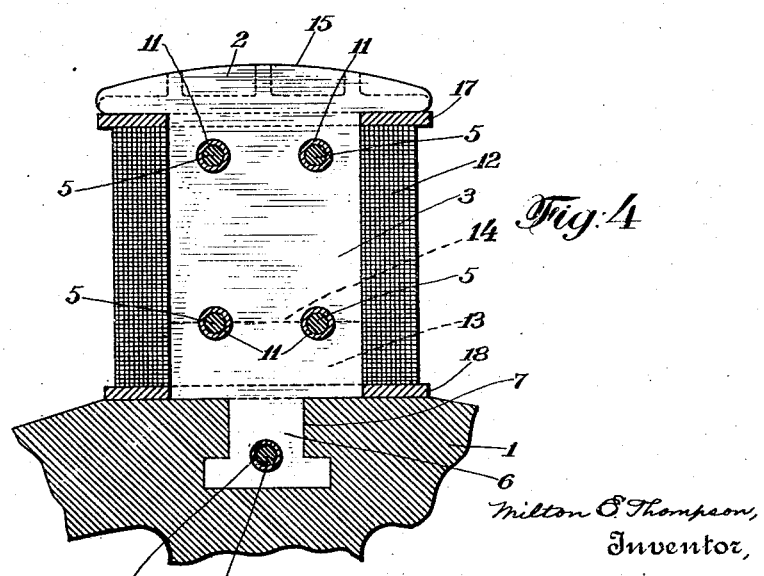

In the drawings Figure 1 is a side view of a portion of a rotor provided with one form of my improvements, certain parts being omitted to more clearly illustrate the same. Fig. 2 is a top plan view of the parts shown in Fig. 1. Fig. 3 is a transverse section of one of the field pole structures shown in Figs. 1 and 2. Fig. 4 is section taken on the line IV—IV of Fig. 3. Fig. 5 is a diagram of curves illustrating in a general way the improvement in the magnetization curve obtained by my invention.

Referring to Figs. 1 to 4, 1 represents a suitable spider or frame of a rotor of a rotary field alternating current dynamo-electric machine. Secured about the periphery of the spider 1 are the field poles 2. The field poles 2 are, in the main, made of laminations 3, the general shape of which is clearly shown in Fig. 4. The laminations are bunched together in a well known manner and at each end thereof is an end piece 4. The laminations 3 and end pieces 4 of each pole piece are secured together by bolts 5 to form a rigid structure. The lower ends of the laminations 3 are dove-tailed or mortised shaped as at 6 and these portions fit within mortised shaped recesses 7 so that the pole structures 2 are held firmly in place and prevented from moving radially. To prevent the pole structures 2 from moving laterally strips 8 are placed around the edges of the spider and are secured thereto by bolts 9. The strips 8 cover the ends of the recesses 7 and thus prevent the pole structures 2 from moving laterally. Air spaces 10 are provided among the laminations 3 and in order to keep the laminations properly separated for this purpose tubular sections 11 are placed around the bolts 5 in these spaces. These air spaces are for the purpose of ventilation.

The field windings are placed upon the structure in the usual manner as shown at 12. At the base of these windings part of the laminations 3 are cut away as shown at 13 forming a plurality of elongated air gaps of relatively high reluctance at the base of the field structures. The short laminations are cut away on the line 14 of Fig. 4. The portions 6 are made up of the lower ends of the uncut laminations and small laminæ of the proper shape acting as filler pieces. I prefer that these cut-away portions shall be at the roots of the pole pieces as shown, but in any event, they must, in order to avoid harmful leakage, be located in the magnetic circuit back of the centers of the coils 12 and preferably not substantially nearer such centers than the position shown.

In order to provide a sufficient circulation of air between the field poles to cool them I locate fan blades 16 at the sides of the windings 12. To properly support the blades 16 I provide each pole structure with a plate 17 encircling the pole structure at the top of the windings 12, and a plate 18 encircling the pole structure at the bottom of the windings. These plates may be made integral with the end pieces 4 if desired. However, they are arranged to extend beyond the end pieces 4 on one side and are provided with holes 19 therein. The fan blades 16 are provided with pins 20 secured thereto, which pins are inserted in the holes 19 to hold the blades securely in place. The blades 16 are curved and diagonally arranged with respect to the axis of the rotor so that they will deflect the surrounding air into the spaces between the field windings and structures. The poles themselves then deflect the air radially due to their rotation so that the proper circulation of air about the armature is obtained. This arrangement of fan blades is especially simple and economical in construction and most effectively ventilates the field pole structures.

The general operation of the rotor described is well understood. The adjacent poles are of different polarity so that the flux passes from the base of one pole structure to the base of the adjacent pole structure, thence up through the pole structure, then through the armature and down through the first pole structure.

By reference to the curves shown in Fig. 5 a clearer understanding of the results produced by my invention may be had. Curve 23 is a magnetization curve or "field characteristic" of an alternator provided with the small armature clearance I use but without the portion of high reluctance in the field structure located and arranged in accordance with my invention. Curve 22 is a similar curve such as is produced in the same alternator when my invention is applied. Curve 21 is a typical magnetization curve of the alternator such as has hitherto been the standard, namely, with a large armature clearance to provide a large air gap at that point. Curve 23 rises abruptly on almost a straight line of steep inclination, this being due to the small armature clearance. This line turns sharply to the right when the magnetic circuit approaches saturation. Curve 21, due to the large air gap has a much smaller angle of inclination, but is otherwise much the same in character. Curve 21 can never reach as great a height as curve 23 because the greater armature clearance causes a much increased leakage from pole tip to pole tip, reducing the available flux through the armature. Curve 22, produced by my invention, commences like curve 23 because of the smaller armature clearance. It soon, however, begins to bend to the right due to the saturation of the subdivided portions of the iron at the base of the pole, and the curve is sharp because these portions are relatively long and narrow. Above this bend, however, line 22 is practically a straight line having the desired angle of inclination to produce the best inherent regulation without requiring too great an exciting current. The inclination of this line is produced because the main body of the iron of the circuit has not approached saturation.

The height of the main bend in curve 22, the sharpness of that bend, the straightness of the curve of this bend, and the angle of inclination of the upper part of the curve, are all important points in securing the object of my invention and are all completely under the control of the designer employing my invention. In order to produce a straight line above the bend within the working limits of the machine, there must be a liberal cross-section of metal throughout the magnetic circuit, (except at the portion of increased reluctance), the height of the bend in the curve is determined by the cross-section of the metal at the point of increased reluctance. The sharpness of bend is determined by the relation between the thinness of the sub-divisions of metal at the point of increased reluctance relatively to the length of such sub-divisions. The angle of the curve above the bend is determined by the length of the air gaps at the portion of increased reluctance.

In general it may be said that the flatter the portion of the curve that is being used in the operation of the machine, the better is the inherent regulation, but the greater is the exciting current necessary to produce the requisite field flux when a load (and especially a load of low power factor) is upon the armature, while the greater the inclination of the portion of the line being used in the operation of the machine the worse is the inherent regulation because of the great changes of voltage caused by the variations of load. Bearing this in mind and referring to curve 23 representing an alternator which has small clearance but which is not provided with my invention, it will be noted that it would be impossible to work on any part below the bend because the angle is so steep that the throwing on of the load would completely demagnetize the field structure. On the other hand, if a stronger excitation is employed the exciting current required to produce the necessary voltage from the machine at full load is so great because of the flatness of the curve above the bend as to make the machine highly inefficient. Such a machine is so inefficient that no competent electrical engineer would attempt to use it. Curve 21 is similar in shape to the usual "field characteristic" of alternators hitherto used and is open to the same objections as curve 23 but to a much less degree. Such a curve is ordinarily employed with a normal voltage about that corresponding to the point where 21 and 22 cross. With such alternators it is not attempted to work much above this point because it becomes very difficult to maintain full voltage with low power factor loads in view of the great leakage from pole tip to pole tip resulting from the large armature clearance. Curve 22 which is a curve taken from an actual machine embodying my invention is almost an ideal shape. This feature, however, is not claimed as part of my invention herein but is included in my divisional application No. 847,377, filed June 26, 1914, for improvements in dynamo electric machines. This may be satisfactorily employed with a normal working voltage about that corresponding to the point at which curves 21 and 22 cross. The line on both sides of this point is practically straight and of just about the proper inclination to take care of changes of load and power factor without unduly varying the exciting current and without great changes of voltage due to changes of load and power factor.

Although I have described my improvements in great detail, nevertheless I do not desire to be limited thereto except as clearly specified in the appended claims, since many changes and modifications may well be made within the spirit and scope of my invention.

Having fully and clearly described my improvements, what I claim as new and desire to secure by Letters Patent of the United States, is:

1. An alternator provided with laminated pole structures, some of the laminations being cut away so as to form air gaps at the base of the pole structures.

2. An alternator having a field pole structure and suitable windings and provided with air gaps in the structure on the opposite side of the windings from the pole face, said gaps being very thin as compared with their radial dimensions.

3. An alternator having a field pole structure and suitable windings thereon, and provided with air gaps in the structure on the opposite side of the windings from the pole face and the magnetic structures adjacent and between said gaps being very thin as compared with their radial dimensions.

4. An alternator having field pole structures provided each with a plurality of gaps at the base of the field poles and the magnetic structures adjacent and between said gaps being very thin as compared with their radial dimensions.

In testimony whereof, I have signed my name to this specification, in the presence of two subscribing witnesses.

MILTON E. THOMPSON.

Witnesses:
 A. R. MEEK,
 J. M. SCHRAM.